March 12, 1963 J. L. CARMICHAEL 3,080,904
VEGETABLE TRIMMER
Filed Feb. 2, 1961 4 Sheets-Sheet 1
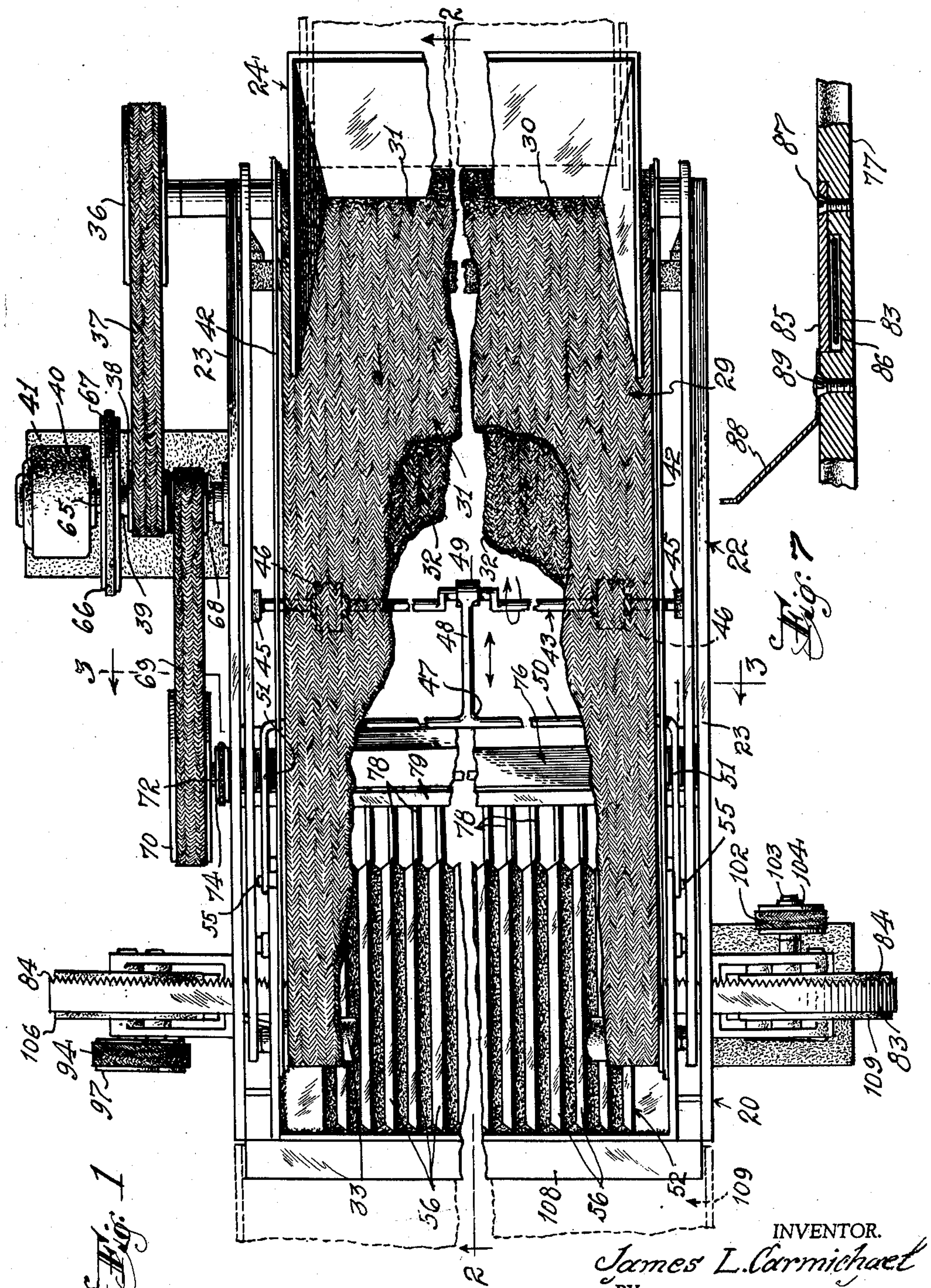
INVENTOR.
James L. Carmichael
BY Victor J. Evans & Co.
ATTORNEYS.

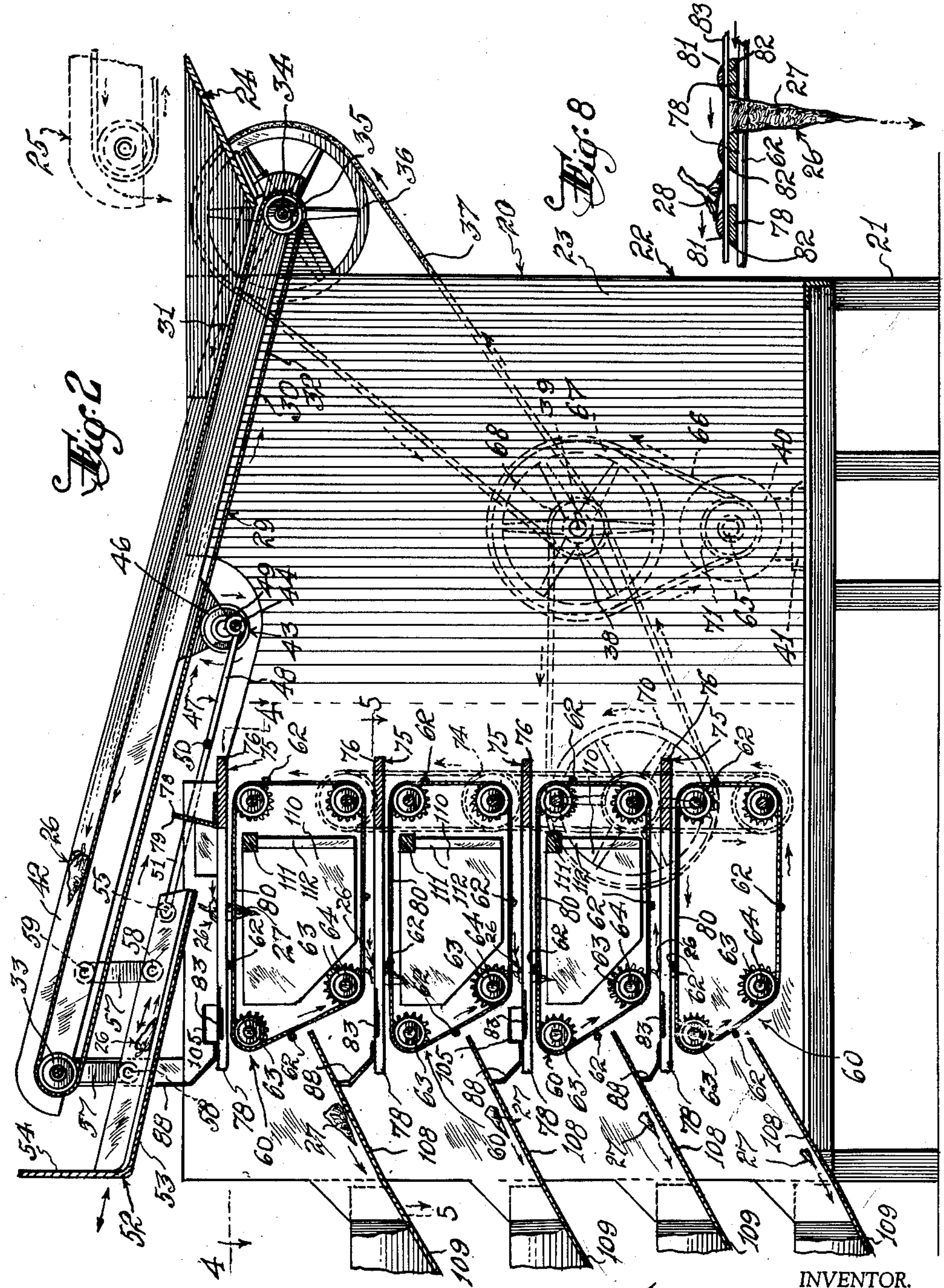
INVENTOR.
James L. Carmichael
BY
Victor J. Evans & Co.
ATTORNEYS.

March 12, 1963 J. L. CARMICHAEL 3,080,904
VEGETABLE TRIMMER
Filed Feb. 2, 1961 4 Sheets-Sheet 3
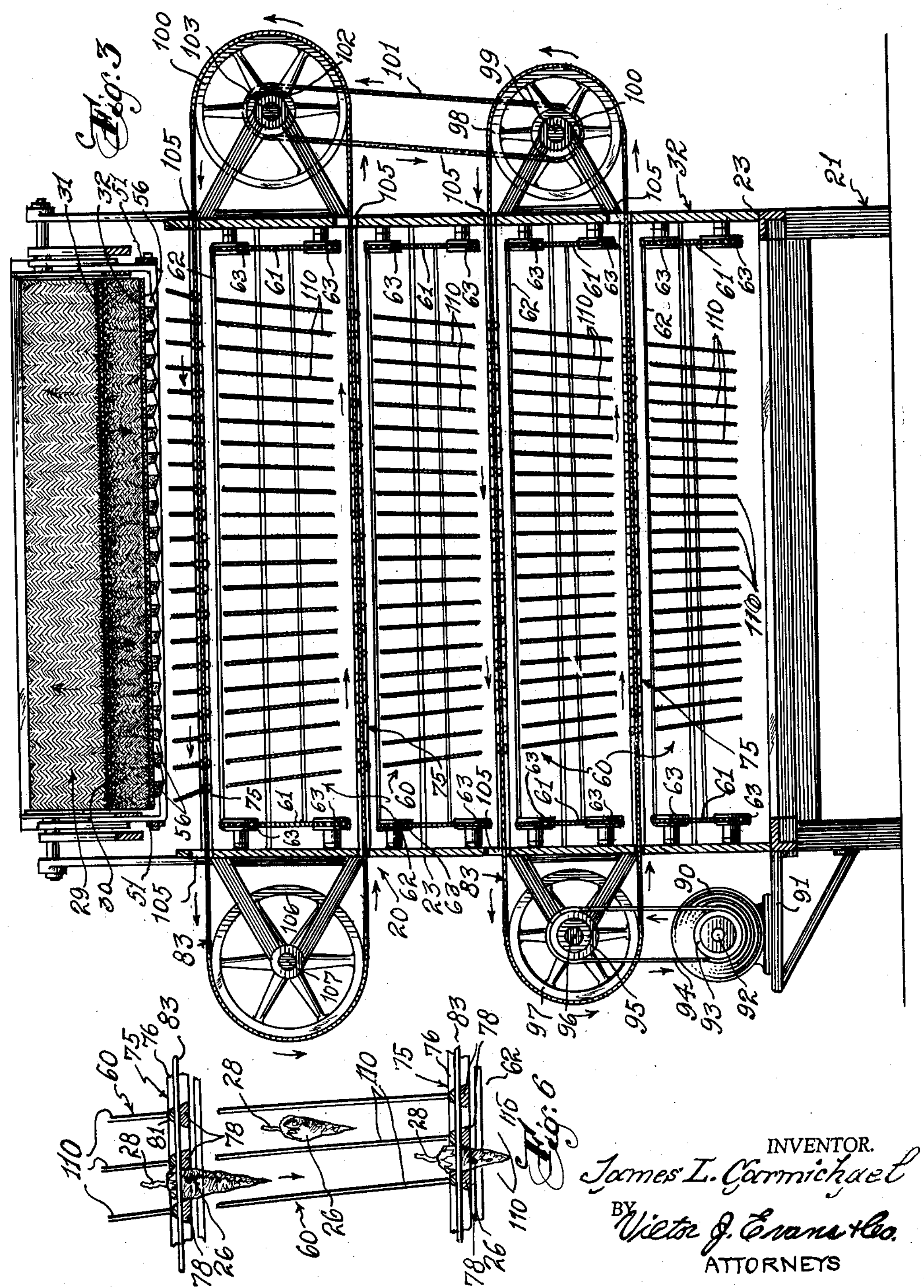
INVENTOR.
James L. Carmichael
BY Victor J. Evans & Co.
ATTORNEYS

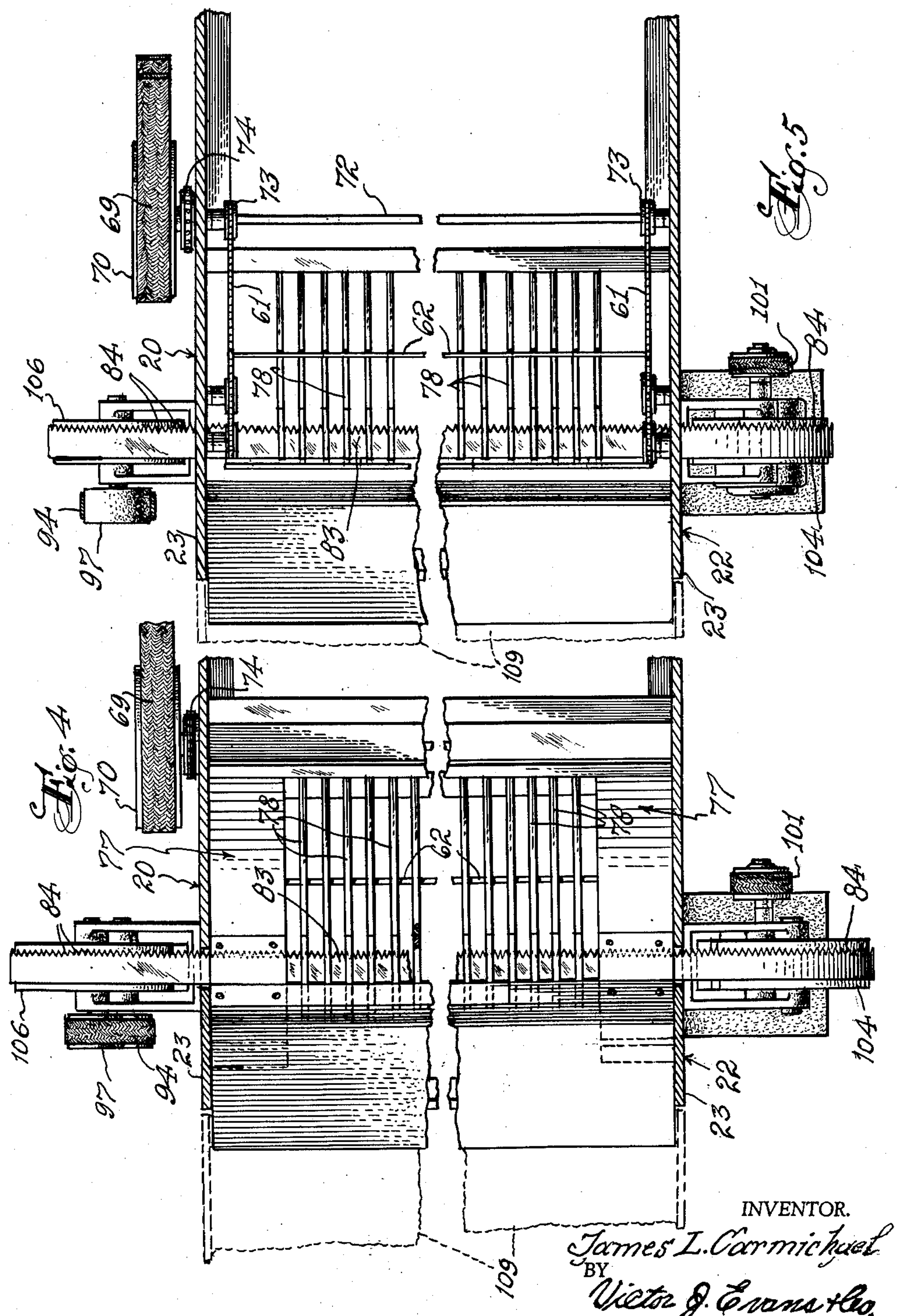
INVENTOR.
James L. Carmichael
BY
Victor J. Evans & Co.
ATTORNEYS.

United States Patent Office 3,080,904

Patented Mar. 12, 1963

3,080,904
VEGETABLE TRIMMER

James L. Carmichael, Angola, La.

Filed Feb. 2, 1961, Ser. No. 86,639
1 Claim. (Cl. 146—81)

This invention relates to a vegetable trimmer, and more particularly to a machine for trimming vegetables such as okra.

The primary object of this invention is to provide a machine for cutting or trimming the stem end from okra whereby the time consuming and costly manual cutting or trimming of okra can be eliminated as for example when okra is being processed in a cannery, or the like.

A further object is to provide a vegetable trimmer which especially suitable for use in trimming the stem off of okra, and for example with the present invention the stem end can be automatically trimmed off of okra before it is canned or frozen, and wherein the vegetable trimmer of the present invention is capable of handling large quantities of okra with a minimum amount of supervision or effort, and wherein the okra will be graded according to size and discharged into exhaust chutes so that it can be conveyed to suitable recepticles or the like for subsequent processing such as freezing, canning or the like.

A further object is to provide an okra trimmer of the type stated which is constructed so that the picked okra is adapted to be loaded into a hopper and then fed from the hopper to the lower end of an inclined conveyor, and from the conveyor the okra is discharged into a shaker which discharges the okra into the uppermost trimming unit of a plurality of superimposed trimming units which trim the okra and simultaneously grade the okra according to size, the stem portion which is trimmed off the okra being discharged from the machine, and the main body portion of the okra which is to be frozen or canned or otherwise processed, is discharged into exhaust chutes according to size or grade so that the entire operation of trimming the okra is substantially automatic due to the provision of the trimming machine of the present invention.

Still another object is to provide such an okra trimmer that is economical to manufacture and efficient in operation and which is rugged in structure and foolproof in use.

These and other objects of the invention will become apparent from a reading of the following specification and claim, together with the accompanying drawings wherein like parts are referred to and indicated by like reference characters and wherein:

FIGURE 1 is a top plan view of the okra trimmer, constructed according to the present invention, and with parts broken away and in section.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 2.

FIGURE 5 is a sectional view taken on the line 5—5 of FIGURE 2.

FIGURE 6 is a fragmentary sectional view illustrating the movement of the okra through the trimming units to accomplish the grading operation.

FIGURE 7 is a fragmentary sectional view illustrating certain details of the cutting or sawing mechanism.

FIGURE 8 is a fragmentary sectional view illustrating the position of the saw blade relative to the rack bars and showing the step of cutting off the stem end of the okra.

Referring in detail to the drawings, the numeral 20 indicates the vegetable trimmer of the present invention which is shown to comprise a supporting structure or base 21 that has a frame 22 supported thereon, and the frame 22 embodies spaced parallel vertically disposed side walls 23. A feed hopper 24 is arranged contiguous to an upper end portion of the frame 22, and the feed hopper 24 is adapted to receive material from a discharge mechanism 25, and for example the present invention is especially suitable for trimming material or vegetables such as okra as indicated by the numeral 26, FIGURE 8 whereby the stem end 28 can be trimmed from the okra 26 to leave the main body portion 27 which can be subsequently processed such as canned, frozen or the like. While the present invention is being described specifically for use in trimming okra, it is to be understood that it can also be effectively and efficiently used for trimming other material or vegetables in addition to okra.

The numeral 29 indicates an inclined conveyor which is supported in the upper portion of the frame 22, FIGURE 2, and the lower end of the conveyor 29 is adapted to receive material such as okra from the hopper 24. As shown in the drawings the conveyor 29 includes an endless wide belt 30 which includes upper and lower reaches or portions 31 and 32, and driven and drive rollers 33 and 34 are arranged in engagement with the ends of the belt 30. A shaft 35 is connected to the drive roller 34, and a pulley 36 is affixed to an end of the shaft 35, there being an endless belt 37 trained over the pulley 36, FIGURE 1. The belt 37 is also trained over a pulley 38 on a shaft 39 which is driven by a motor 40, and the motor 40 may be electrically operated and the motor 40 is adapted to be supported on a suitable platform 41. As shown in the drawings there is provided spaced parallel upstanding guide strips 42 adjacent the sides of the conveyor 29 for helping to maintain the okra on the belt 30 as the okra is conveyed upwardly by the traveling belt 30.

There is further provided a crank shaft 43 which includes an intermediate offset section 44, and the ends of the crank shaft 43 are supported in suitable bearings 45. A plurality of spaced apart friction drive wheels or rollers 46 are mounted on the shaft 43, and the numeral 47 indicates an actuator or connector which embodies a rod 48 and the rod 48 has a portion 49 that is swivelly connected to the offset section 44 of the crank shaft 43. The actuator 47 further includes a conecting portion 50 which has a pair of spaced parallel arms 51 secured thereto or formed integral therewith.

The numeral 52 indicates a shaker which is adapted to receive okra from the upper end of the conveyor 29, and the shaker 52 includes an inclined bottom wall or bottom portion 53 as well as an upstanding back wall portion 54, and the shaker 52 is connected as at 55 to the portions or arms 51 of the actuator 47. The bottom of the shaker 52 is corrugated as at 56. The numerals 57 indicates links for movably supporting the shaker 52, and the links 57 have their lower ends pivotally connected to the shaker 52 as for example by means of pivot pins 58, while the upper ends of the links 57 are connected to a suitable supporting element as at 59.

The trimming machine of the present invention further includes a plurality of superimposed trimming units 60 which each have generally the same construction, and each of the trimming units 60 includes a pair of horizontally disposed endless chains 61, there being a plurality of spaced parallel rods 62 extending between each pair of chains 61, and suitably affixed thereto. The chains 61 are arranged in engagement with sprockets 63 which are supported on shafts such as the shafts 64.

A means is provided for driving the chains 61, as for example from the motor 40, and this means comprises a shaft 65 which is driven by the motor 40, and the shaft 65 has a pulley 71 thereon, there being an endless belt 66 trained over the pulley 71, and the belt 66 is also trained over a pulley 67 on the shaft 39. A small pulley 68 on the shaft 39 has a drive belt 69 thereon, and the drive belt 69 is trained over a pulley wheel 70, and the pulley wheel 70 is affixed to a shaft 72. The shaft 72 has sprockets 73 thereon, and the chains 61 engage the sprockets 73. An endless chain 74 is arranged in engagement with an additional sprocket on the shaft 72, and the chain 74 provides a means for connecting all of the chain drives 61 of the trimming units 60 together so that the chains 61 can all be simultaneously operated from a single power source.

There is provided for each trimming unit 60 a rack 75, and each of the racks 75 comprises a support portion 76 as well as spaced parallel horizontally disposed side elements 77, FIGURE 4, and secured to or formed integral with each support portion 76 is a plurality of spaced parallel bars 78. A baffle 79 is secured to the support portion 76 on the uppermost rack 75, as for example as shown in FIGURE 2, for a purpose to be later described. The racks 75 are arranged so that the spacing between the bars 78 progressively decreases from top to bottom of the superimposed trimming units so that the okra passing downwardly will be automatically graded. The bars 78 are arranged just above the upper reaches 80 of the chains 61.

The upper portions of the bars 78 are somewhat rounded or shaped arcuately as indicated by the numeral 81, FIGURE 8, and the bars 78 are provided with recesses 82. As shown in the drawings there is provided a pair of endless saws or saw blades 83 which are mounted for transverse travel through the recessed portions 82 of the bars 78. The endless saw blades 83 are provided with cutting teeth 84 thereon, and as shown in FIGURE 7, plates 85 are secured above recesses 86 in the side elements 77 as for example by means of securing elements 87. A deflector 88 is arranged as shown in the drawings, and each of the deflectors 88 are secured in place as at 89.

A means is provided for driving the pair of endless saws 83, and this means comprises a motor such as an electric motor 90 which is suitably supported on a platform 91, FIGURE 3, and the motor 90 serves to drive a shaft 92 which has a small pulley 93 thereon, and there being an endless belt 94 trained over the pulley 93, and the belt 94 is also trained over a small pulley 95 on a shaft 96. A relatively large pulley 97 is suitably affixed to the shaft 96, and the lowermost saw blade 83 has an end portion thereof trained over the pulley 97. The lowermost saw 83 is also arranged in engagement with a pulley wheel 98 which is mounted on a shaft 99, and the shaft 99 has a small pulley 100 thereon which has an endless belt 101 trained thereover. The belt 101 is also trained over a small pulley 102 on a shaft 103, and the shaft 103 has a large pulley 104 thereon, the upper saw blade 83 being trained around the pulley 104. The numerals 105 indicate openings or outlets in the side walls 23 whereby the chains can travel through these outlet openings 105 and also the stem portions of the okra which have been trimmed off can be discharged out through the openings 105. The upper saw 83 is also trained over a guide wheel or pulley 106 which is connected to a shaft 107 that may be supported by suitable bearings, braces or the like.

As shown in FIGURE 2 for example, there is provided a plurality of inclined baffles or guide elements 108 that are adapted to guide the trimmed okra that is discharged from the trimming units 60, into exhaust chutes 109, and the okra will be discharged into the exhaust chutes 109 in a graded condition according to size, and from the members 109 the okra can be conveyed to a suitable location in any suitable manner, as for example the okra can be conveyed or removed from the chutes 109 to a suitable mechanism for accomplishing freezing or canning of the trimmed okra.

Each of the trimming units 60 is provided with a plurality of spaced apart upstanding guide members or partitions 110 which help guide the okra that moves downwardly through the superimposed trimming units, and the guide members 110 are suitably secured to spaced apart legs 112 that depend from horizontally disposed cross pieces 111, and the cross pieces 111 can be suitably affixed in the frame of the machine in any suitable manner.

From the foregoing, it is apparent that there has been provided a machine which is especially suitable for trimming vegetables such as okra, and with the parts arranged as shown in the drawings, it will be seen that the picked okra is adapted to be deposited in the hopper 24, and for example the okra may be loaded or deposited into the hopper 24 by means of a conveyor 25. With the motors 40 and 90 energized or actuated, it will be seen that the various moving parts will be actuated and for example the motor 40 will rotate the shaft 65 which in turn will move the belt 66 so as to rotate the pulleys 67 which in turn will rotate the shafts 39 that have the pulleys 38 thereon and this causes movement of the endless belt 37 so as to rotate the pulley 36 which is affixed to the shaft 34 of the conveyor 29. This rotation of the shaft 34 causes the endless belt 30 to travel in a counter-clockwise direction, FIGURE 2, and it will be seen that the okra or other material being trimmed will fall by gravity from the hopper 24 onto the lower end portion of the moving belt 30 and this okra will be carried upwardly by the belt 30 and will be guided between the strips 42 and this okra will then leave or be discharged from the upper end of the belt 30 and will fall into the moving shaker 52. It is to be noted that the shaker 52 is being continually moved or shakened due to the provision of the crank shaft 43 and its associated parts. Thus, the shaft 43 includes the offset intermediate section 44 which has the portion 49 of the rod 48 arranged in engagement therewith, FIGURE 1, and the drive wheels 46 on the shaft 43 are arranged in frictional engagement with the under surface of the lower reach 32 of the traveling belt 30 so that as the belt 30 travels in a counter-clockwise direction, FIGURE 2, the wheels or rollers 46 will be turned and this will rotate the shaft 43, and due to the provision of the offset section 44, the actuator 47 will be moved back and forth and in view of the fact that the arms 51 of the actuator 47 are connected as at 55 to the shaker 52, it will be seen that this reciprocation of the actuator 47 will result in shaking movement of the unit 52. The shaker is provided with the bottom portion that is corrugated as at 56, and the bottom portion of the shaker is inclined as for example as shown in FIGURE 2 so that the okra will move downwardly along the inclined bottom portion 53 and will drop on to the upper most trimming unit 60, the baffles 79 helping to deflect or guide the okra into the proper position on the trimming unit 60.

As the okra drops down from the shaker 52, it first moves down in engagement with the bars 78 of the uppermost rack 75. The okra is indicated by the numeral 26 in the drawings, and the purpose of the present invention is to cut off the stem portion 28 of the okra so as to leave the main body portion 27 which is adapted to be subsequently processed such as frozen, canned or the like. The uppermost rack 75 has its teeth or bars 78 spaced a predetermined distance apart, and the bars 78 of the next rack 75 therebelow are spaced slightly closer together, and the next lowest rack has its bars 78 spaced a little further closer together, and the lowermost rack has its bars spaced closer together than the bars of any of the racks thereabove. While the present invention illustrates a machine provided with four trimming units, it is to be understood that the number of these trimming units can be varied as desired or required.

The purpose of having the bars of the grids spaced apart at different amounts of clearance between the bars is to effect a grading operation at the same time that the okra is being trimmed. That is, the bars 78 of the uppermost rack 75 are spaced furtherest apart so that the larger pieces of okra will be retained between these bars 78 while the smaller pieces of okra, foreign matter such as dirt or the like will be able to pass downwardly between these bars 78 and this is illustrated in FIGURE 6. The next lower rack 75 will catch or hold okra of a slightly smaller size and that retained by the topmost rack, while the okra which is too small to be held by the second from the top rack will move downwardly and either be held by the next lower rack or else it will move downwardly to the bottom rack so that the okra will be graded due to the provision of the bars 78 which are spaced apart at different distances depending upon their elevation. The bottom of the frame is open so that dirt or the like or very small pieces of okra can drop downwardly and such material can be collected in a suitable box, recepticle or the like if desired or required. The downwardly moving okra is guided by means of the spaced apart partitions 110 which are suitably supported in place as at 111 and 112.

Considering further the cutting action that takes place to trim the stem portion 28 from the main body portion 27 of the okra 26, it will be seen that for example the larger pieces of okra which are retained between the bars 78 of the upper rack 75 will hang downwardly and will be snugly held between adjacent bars 78 as for example as shown in FIGURES 6 and 8. At the same time, the chains 61 will be actuated or moved in a counterclockwise direction, FIGURE 2, and since the chain 61 has the rod 62 affixed thereto, it will be seen that this movement of the chain 61 will cause the rod 62 to travel in such a manner that as the upper reach 83 of the chain 61 travels below the bars 78, the rods 62 will push the okra 26 that is suspended between the bars 78 along the rack as for example from right to left in FIGURE 2, until this okra is moved into the path of the traveling saw blade 83. The saw blade 83 is adapted to travel through the recessed portion 82 of the bars 78 so that the teeth 84 of the saw blade will cut off the stem portion 28 of the okra leaving the lower portion 27 of the okra still held between the bars 78, and the stem portions 28 will be carried laterally and discharged out through the openings 105 and these stem portions can be collected in a suitable receptacle or the like and subsequently discarded.

After the stem portions 28 have been severed or cut or trimmed from the okra, the remaining portions 27 of the okra are carried beyond the transversely moving saws 83 and these portions 27 are deposited in the inclined chutes 108 and from the chutes 108 the okra is discharged into members 109 which can be suitably emptied whereby the portions 27 are ready for subsequent processing such as canning, freezing or the like.

In view of the fact that each of the trimming units 60 will trim only okra of a certain size, it will be seen that the okra that is discharged into each of the four chutes 108 will be automatically graded so that the machine of the present invention will permit the trimming of okra in a time saving and economical manner.

The drive for the pair of saws 83 is from the motor 90 which rotates the shaft 96 by means of the endless belt 94, and rotation of the shaft 96 turns the pulley 97 which has the lowermost saw 83 thereon. The lowermost saw 83 is also trained over a pulley 98 which is connected as at 101 to the uppermost saw 83 so that both the upper and lower saws will be driven or operated simultaneously from the same engine or motor 90. The pair of saws 83 are arranged so that only two saws are needed to provide the cutting action for all four trimming units 60. Thus, it will be seen that the upper reach of the saw 83 provides the cutting action for the top rack 75, and the lower reach of the upper saw provides the cutting action for the rack 75 that is second from the top, FIGURE 2. Similarly the upper reach of the lower saw 83 provides the cutting action for the rack or trimming unit that is second from the bottom, and the lower reach of the lower saw provides the cutting action for the lowermost trimming unit.

The parts can be made of any suitable material and in different shapes or sizes.

The deflectors 88 help catch the tops or stems 28 of the okra whereby these stems will be guided out through the openings 105 due to the traveling saws 83. The walls or guides 110 keep the okra falling straight as for example as shown in FIGURE 6. The corrugated bottom portion 56 of the shaker 52 helps turn the okra right side up so that the okra will be deposited in the upper trimming unit in the proper fashion ready for trimming or cutting. The pair of saws 83 are arranged so that four separate cutting actions take place from the upper and lower reaches of the saws. The machine of the present invention is especially suitable for cutting the stem end off of okra and in processing okra the stem end must be cut to meet Government grades and heretofore this job has been done by hand which is very slow and costly and the present invention will permit the cutting to be done automatically so that a saving in time and expense will be possible. The machine is especially suitable for use in a cannery since it can be used for trimming the stems off of okra. When okra is picked from the stalk there is a stem on it which is about one inch long and this stem end must be trimmed before it is canned or frozen and at the present time this is being done by hand. The machine includes the racks 75 which each include the bars 78 that may be made of a suitable material such as stainless steel, and these bars 78 have a somewhat rounded upper portion 81. There are four racks placed one above the other, and the bars of the top rack are adapted to be spaced a suitable distance apart such as three-quarters of an inch apart, and the next bars below eleven-sixteenths of an inch, and the next below five-eighths of an inch, and the bottom rack has its bars spaced nine-sixteenths of an inch apart. The okra that is too small to hang in the top rack will fall through to some of the racks below, and the spacing on these racks will handle all of the okra suitable for canning.

Two band saws 83 are used for cutting the okra, and these are operated by the electric motor 90, as previously stated. The top band saw runs on wheels such as the wheels 106 and 104, and these wheels control the spacing between the top rack and the one therebelow. The bottom saw runs on slightly smaller wheels than the top saw which controls the spacing of the two lower racks. The saw blade runs over the bars in the racks which have been counter sunk or recessed as at 82 to permit the saw to cut the stem low enough to pass the Government grade for okra. The band saw blade is adapted to be made of a suitable material such as stainless steel and may be seven-eighths of an inch wide. The larger wheels are used on the upper saw to allow for the large okra.

The guides 110 serve to keep the okra straight and it falls from one rack to another and these guides 110 can be made of a suitable material such as sheet metal and may be approximately six inches wide and twenty inches long and these guides are arranged vertically directly under each half round bar that forms part of the racks. The feeder chains 61 carry the pusher rods 62 which serve to move the okra through the trimming units, and special links may be placed in the chains 61 for providing a means of affixing the rods 62 thereto.

The conveyor belt 30 is set on an angle in order to keep the feed hopper 24 low. The belt 30 is adapted to be made of rubberized material and may be thirty-six inches wide and ten feet long and it serves as a grading belt. Thus, okra is adapted to be poured into the hopper 24 and conveyed upwardly by the belt 30 whereby it will then fall into the shaker 52. The shaker may be thirty-six inches wide and eighteen inches long, and the bottom of the shaker is corrugated as at 56 to match the half-round bars 78 in the rack 75. The shaker is hinged to the conveyor frame, and the eccentric arrangement including the members 43 and 47 are used to shake the member 52 so as to cause the okra to fall into the groove for discharge into the top rack.

The exhaust chutes 108 catch the okra after it has been trimmed. The pusher rods 62 can be made of a suitable material such as steel and they are adapted to fit in special links on the feeder chains 61 and these rods push the okra after it falls into the racks into the path of the saw. The partitions 110 serve as guides to cause the okra to fall into the rack in proper position. Suitable sprockets such as the sprockets 64 are provided for the chains 61, and these sprockets are idlers except the inside bottom ones which provide driving action for the chains. The shaker is driven by the eccentric action from the friction drive rollers 46. The members 88 help deflect the top or stems as they are cut, and the saw running along the racks carry the tops to the outside through the openings 105.

In actual use, the okra is adapted to be poured from field containers into the sealed hopper 24 and the okra is then received on the conveyor belt 30 and is carried on the belt to the end and discharged onto the shaker 52 and the shaker shakes the okra out and it drops into the guide and into the rack. The larger okra hangs in the top rack, and the smaller okra falls through the rack to some of the lower racks where it hangs. The pusher rods 62 push the okra along the rack through the saw 83 where the stems are removed and the stems or tops are carried by the saw with the help of the metal strips 88 to the discharge openings 105, and the trimmed okra falls onto the exhaust chutes 108 and into containers such as the containers 109.

The racks include the bars which are placed in side by side relation with respect to each other and the bars have the correct spacing therebetween for the pod of okra to go therebetween, and the stem end of the okra is the largest end so that it will hang in the rack with the stem end up. The band saw has the teeth 84 for the cutting of the vegetables, and the pulleys for the saws are of a proper size to permit proper clearance between the top rack and the lower rack, and the same saw cuts the okra on the top rack and the rack therebelow. The strips or partitions 110 have the same spacing as the bars of the rack so as to guide the okra that is too small to hang in the upper rack down to the next lower rack and these guides or partitions keep the okra straight as it falls down to the next lower rack. The shaker or spreader 52 smoothes out the okra before it falls on the uppermost rack, and the exhaust chutes catch the okra after it has been trimmed. The okra comes through the racks in upright positions, and the parts are properly timed or spaced so as to permit the okra to drop in place in an upright manner whereby the pusher rods can push the okra through the saw, and the smaller okra will fall through and be cut on a lower saw mechanism. The machine may be adjusted so as to cut the stems at required lengths to make different styles of canned okra. The very slow and tedious job of cutting or trimming okra by hand will be eliminated with the present invention, and okra to be canned such as "whole," "whole salad," or "cut" okra can be stemmed to meet U.S. Government standards or packing requirements.

Minor changes in shape, size and rearrangement of details coming within the field of invention claimed may be resorted to in actual practice, if desired.

What is claimed is:

In a vegetable trimmer including a base, a frame supported on said base and said frame including a pair of spaced parallel vertically disposed side walls, a feed hopper supported adjacent an upper end portion of said frame, an inclined conveyor for receiving material from said feed hopper and said conveyor including a wide endless belt that includes an upper and lower reach, a motor driven shaft operatively connected to said conveyor, a pair of spaced apart guide strips arranged adjacent the sides of said conveyor, a crankshaft rotatably supported below said conveyor and said crankshaft including an intermediate offset section, drive wheels on said crankshaft frictionally engaging the lower reach of said conveyor, an actuator including a rod having a portion thereof connected to the offset section of said crankshaft, said actuator further including a connecting portion terminating in a pair of spaced parallel arms; and a shaker connected to said arms and said shaker including an inclined bottom wall provided with a plurality of spaced apart corrugations and said shaker further including an upstanding back wall, links movably supported in said shaker, a plurality of superimposed trimming units mounted below said shaker and each of said trimming units including a pair of horizontally disposed endless chains, spaced parallel rods extending between said chains and secured thereto, means operatively connecting said motor driven shaft to said chains, each trimming unit further including a rack that embodies a support portion which has a plurality of spaced parallel bars affixed thereto, and each rack further including a pair of spaced parallel side elements, a baffle on the support portion of the upper rack, said bars having aligned recesses therein, endless saw blades mounted for movement through the recesses in said bars, motor means for driving said saw blades, there being openings in the side walls of the frame for the movement therethrough of the saw blades, deflectors affixed to said racks adacent said saw blades, inclined exhaust chutes for receiving trimmed material from the trimming units, and a plurality of upstanding partitions defining guide members for said trimming units.

References Cited in the file of this patent

UNITED STATES PATENTS

| | | |
|---|---|---|
| 717,726 | Vincke | Jan. 6, 1903 |
| 739,736 | Speiser | Sept. 22, 1903 |
| 2,605,799 | Ratti | Aug. 5, 1952 |
| 2,966,263 | Holmes | Dec. 27, 1960 |

FOREIGN PATENTS

| | | |
|---|---|---|
| 443,267 | Italy | Dec. 15, 1948 |